UNITED STATES PATENT OFFICE.

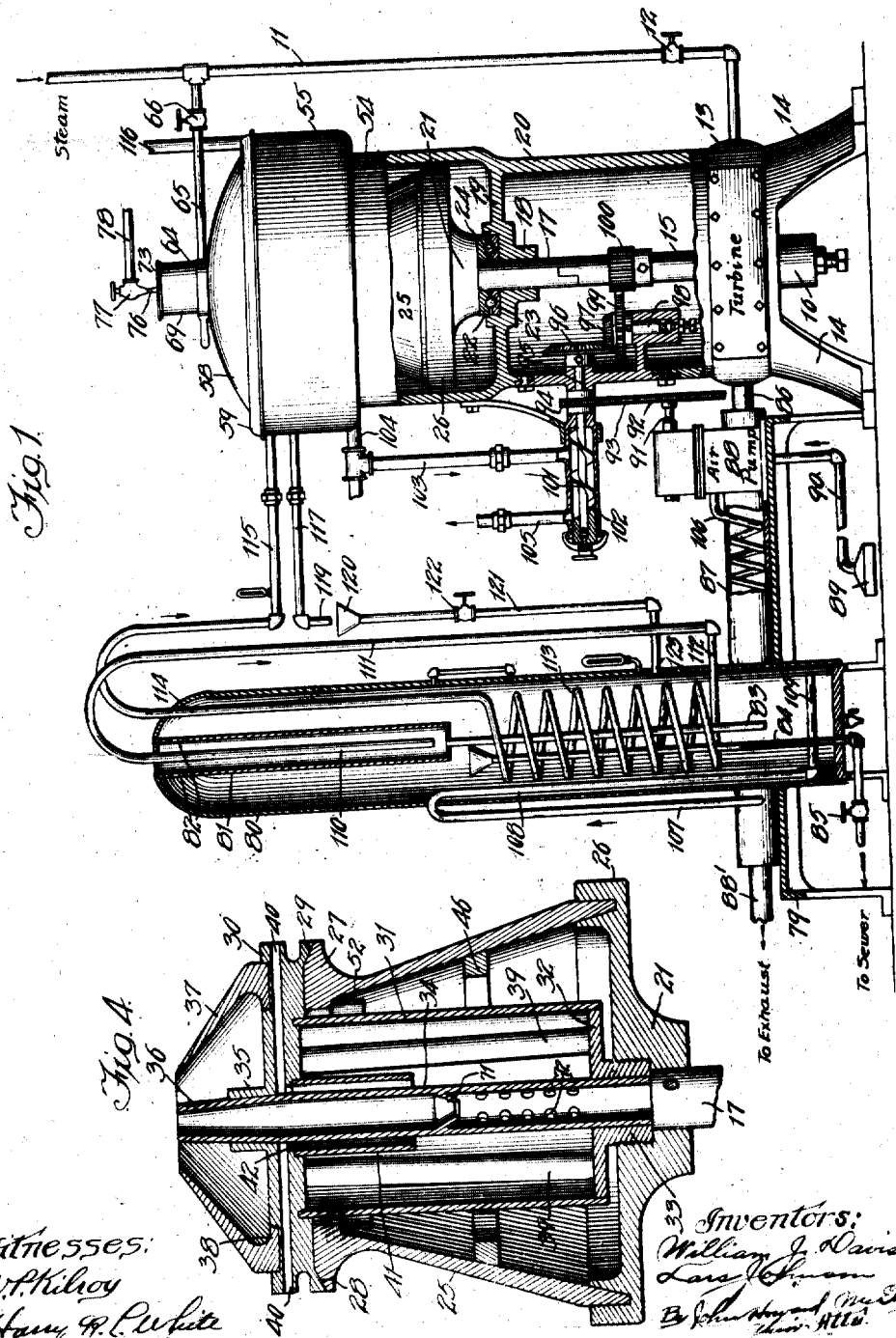

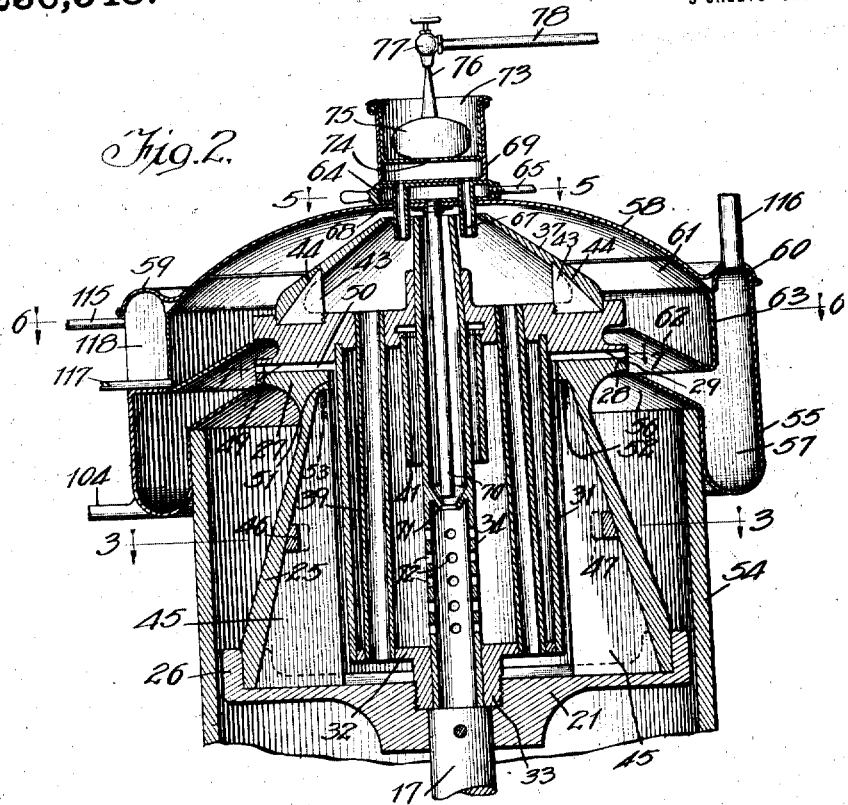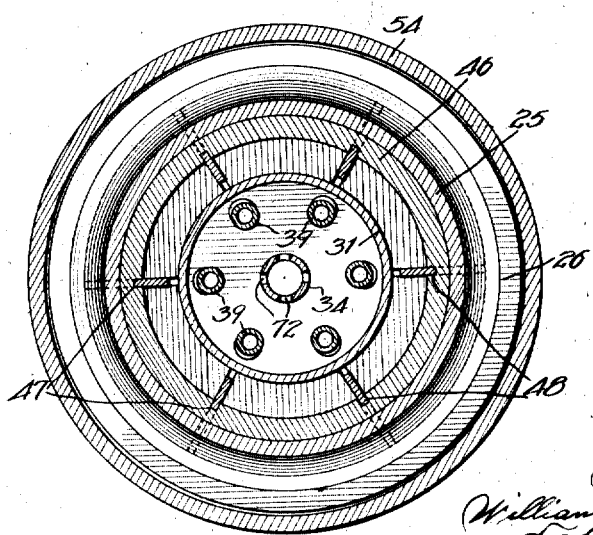

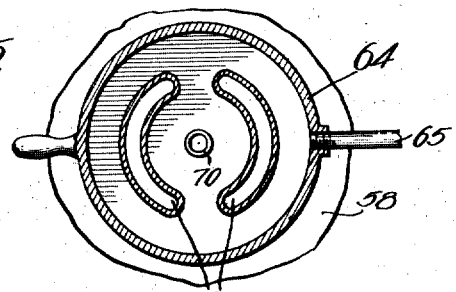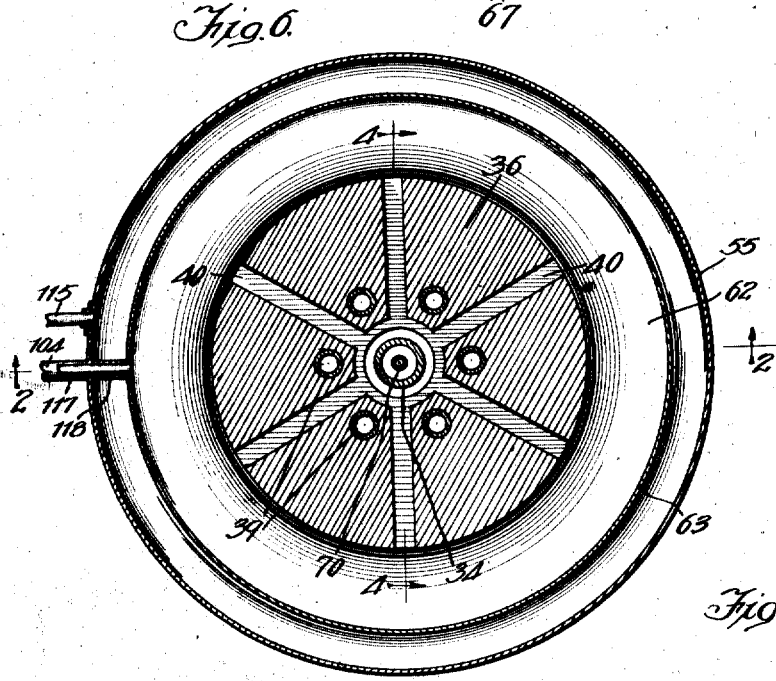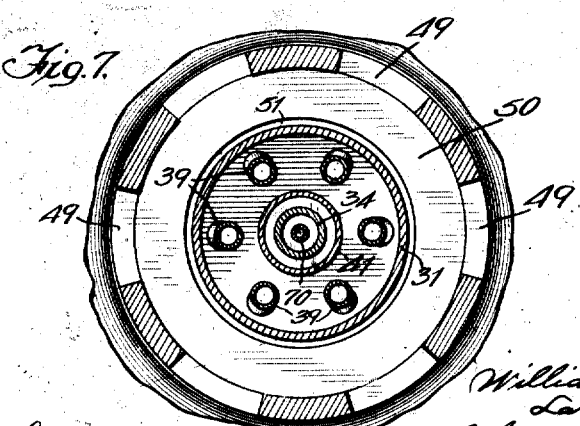

WILLIAM J. DAVIS AND LARS JOHNSON, OF CHICAGO, ILLINOIS; SAID JOHNSON ASSIGNOR TO SAID DAVIS.

APPARATUS FOR TREATING MILK.

1,236,548.     Specification of Letters Patent.     Patented Aug. 14, 1917.

Application filed December 4, 1916. Serial No. 134,806.

*To all whom it may concern:*

Be it known that we, WILLIAM J. DAVIS and LARS JOHNSON, citizens of the United States, and residents of Chicago, in the county of Cook and State of Illinois, have invented certain new and useful Improvements in Apparatus for Treating Milk, of which the following is a full, clear, and exact specification.

Our invention is concerned with a novel apparatus for treating milk, and is designed to purify, clarify, aerate, and, if desired, pasteurize, and possibly, elevate the milk, at a single operation, all as will be fully described in the following specification and particularly pointed out in the claims.

To illustrate our invention, we have annexed hereto three sheets of drawings, in which the same reference characters are used to designate identical parts in all the figures, of which,—

Figure 1 is a side elevation of the complete apparatus, with some parts thereof broken away and in central vertical section;

Fig. 2 is a vertical section, on an enlarged scale, on the line 2—2 of Fig. 6;

Fig. 3 is a horizontal section on the line 3—3 of Fig. 2;

Fig. 4 (Sheet 1) is a vertical section of a portion of the mechanism shown in Fig. 2, but on the line 4—4 of Fig. 6;

Figs. 5, 6 and 7 are horizontal sections on the lines 5—5, 6—6, and 7—7, respectively, of Fig. 2;

Fig. 8 is a perspective view, on an enlarged scale, of one of the radial peripheral partitions found in the upper portion of the rotating drum, while Fig. 9 is a similar view of a similar set of partitions found in the bottom portion of the drum.

In carrying out our invention in its preferred form, steam is employed as the motive power and as the source of heat, and the same is conducted through a pipe 11 provided with a cock 12 to the steam turbine 13 forming the base of the drum casing and supported upon the legs 14. This turbine is of the vertical-axis type, and is secured on the vertical shaft 15, which is journaled at its lower end in the bearing 16 supported from the base of the machine, and is connected at its upper end to the shaft 17 forming the spindle of the revolving drum, which is journaled in a bearing 18 formed in the horizontal web 19 of the casing 20.

The clarifying and heating drum is secured on the upper end of the shaft 17, and is shown in Figs. 2 to 9, inclusive, where it will be seen to consist of the disk-shaped base 21, which preferably is provided with the bearing disk 22 coöperating with a similar bearing disk 23 centrally mounted in the horizontal web 19, the opposing faces of the two disks being provided with an annular channel to receive the balls 24 to form the ball bearing with which such devices are customarily supplied. The body of the drum is formed of a hollow, truncated, conical casting 25, the lower end of which fits tightly in the annular channel formed in the vertical peripheral flange 26 of the disk 21, forming a liquid-tight joint. At its upper end, this conical cylinder 25 is provided with an outwardly extending, annular flange 27, which has on its outer edge the inclined annular bearing surface 28, which is designed to coöperate with the corresponding annular bearing surface 29 formed on the under side of the outer edge of the disk 30 which forms the top of the main portion of the drum. This disk 30 has seated in an annular channel formed in the under side thereof the upper end of a cylinder 31, which is brazed or otherwise suitably secured to the disk 30, and is likewise rigidly secured to the periphery of the disk 32 which forms the bottom of the inner cylinder of the drum. This bottom 39 has a hub-like portion 33 which is screwed into a suitable threaded recess formed in the center of the disk 21, thus forming a simple structure by which the three main parts of the drum,—*i. e.*, the bottom 21, the body 25, and the top 30—can be rigidly secured together simply by assembling the parts and screwing the hub 33 tightly into place by turning the top 30. Centrally located within the cylinder 31 is the vertical tube 34, which has its lower end secured in the opening in the hub 33 and its upper end passing through a suitable opening formed by the vertical annular flange 35 projecting up from the center of the top of the disk 30. The upper portion 36 of this tube is preferably tapered slightly, as shown, and the interior of the flange 35 is similarly tapered so as to make a tight fit between the two parts. A smaller chamber is formed on the top of the drum by the hollow, truncated, conical piece 37, which is preferably provided at its lower end with the inwardly directed annular flange 38, which is threaded into a suitable channel formed in the top of the disk 30. Extending between and through the disks 30 and 32 are a plurality, six as illustrated, of tubes 39, which are preferably brazed in place, and form a plurality of passages between the top and bottom chambers of the drum. The disk 30, as seen in Fig. 6, has a plurality of small radial passages 40 bored therethrough and coöperating with an annular passage formed by the sleeve 41, which is secured in a suitable annular recess in the center of the bottom of the disk 30 and extends down as shown, surrounding the tube 34. A number of openings 42, corresponding in number to the passages 40, connect said passages with the annular passage formed between the sleeve 41 and the tube 34. The upper chamber of the drum is preferably provided with a plurality of radial partitions 43, which are shown as in the form of triangles, and which are seated in suitable radial recesses 44 formed in the interior of the bottom of the truncated conical piece 37. The main chamber of the drum is likewise provided with similar radial partitions 45, which are seated at their lower ends in suitable radial, vertical channels formed in the top of the disk 21, and are held in place at their middle portions by the horizontal ring 46 secured on the inner wall of the drum 25, and forming an inwardly projecting flange provided with a plurality of recesses 47 therein, with which coöperate the portion of the partitions 45 adjacent to the notches 48 provided therein. The outer downwardly inclined portion of the disk 30, on the under side of which is formed the annular bearing surface 29, has formed therein a plurality of radial passages 49, which open at their inner ends to the horizontal annular passage 50 formed between the top of the conical, hollow drum 25 and the adjacent bottom of the disk 30. The annular passage 50 and the interior of the body of the drum 25 are connected by the annular passage 51 formed between the outside of the top of the cylinder 31 and the inside of the top of the conical drum 25. A ring 52 is preferably employed coöperating with the recesses 53 formed in the top of the partitions 45 to aid in holding them in place. The upper portion 54 of the casing 20 has resting thereon the sheet-metal, annular casing 55, which has the inwardly and upwardly directed portion 56 which approaches the top of the drum 25, so that the milk discharged centrifugally through the passages 49 will flow down on the upper surface of the flange 56 into the annular trough 57 formed by the lower portion of the casing 55. The top of the casing 55 is formed by the dome-like sheet-metal cover 58, which has at its periphery the annular groove 59 resting on the coöperating curved top 60 of the casing 55. Secured on the inside of the casing 55 and forming, so to speak, a part of its inner wall, is an annular sheet-metal ring made up of the inwardly and upwardly inclined top portion 61, the similarly inclined bottom portion 62 and the vertical connecting portion 63, the top portion 61 being conveniently secured to the under side of the dome portion 58. The upper surface of the portion 62 coöperating with the portion 63 forms an annular channel to receive the water of condensation, as will be subsequently described. Secured on the center of the top of the dome 58 is a shallow drum 64, which has threaded into its periphery the steam pipe 65 connected to the steam pipe 11, and having the cock 66 therein. Extending through the drum 64 is a pair of substantially semicircular passages 67, which coöperate with similarly shaped passages formed in the top of the drum 64 and in the bottom of the cup 69 secured on the top of the drum 64. The steam entering the drum does not reach the passages 67, which are cut off from the interior of the drum, but passes around the walls of said passages and to the center of the drum, where it passes down through the vertical pipe 70 screwed in the center of the bottom of the drum and extending down through the center of the tube 34, which has formed therein near the bottom of the tube 70 the inwardly and downwardly projecting flange 71, which forms a sort of a nozzle to coöperate with the end of the tube 70 and form an injector for the steam. A plurality of holes 72 formed in the tube 34 permits the escape of the steam into the cylinder 31. The cup 69 has seated in it a shallower cup 73, which has an aperture 74 in the center of its bottom, which aperture is closed by the body 75 of a float valve having the tapering stem 76 thereof coöperating with the nozzle of the cock 77 secured on the end of the pipe 78 through which the milk is delivered.

Associated with an auxiliary frame 79 is a tank 80, which preferably takes the form of a vertically elongated cylinder, with the sleeve 81, closed at its top and bottom, secured centrally in the top thereof. Apertures 82 formed in the top of the sleeve 81 permit air to pass from the top of the tank 80 into the sleeve 81. A pipe 83 extends from the bottom of the sleeve 81 down toward the bottom of the tank 80. An overflow pipe 84 has its upper end near the bottom of the sleeve 81, while its other end passes through the bottom of the tank 80 and may be carried to any convenient point of discharge, such as an adjacent sewer. A cock 85 may be interposed in this pipe.

The exhaust steam from the turbine 13 passes through an enlarged pipe 86 into a still larger elongated cylinder 87 secured on the top of the frame 79. At the other end of the cylinder is a reduced pipe 88', which will be carried to wherever the steam is to be exhausted. Adjacent to the cylinder 87 is an air pump 88, which pumps air in through a suitable strainer 89, located out of doors, and through a pipe 90, to the inlet port of the pump 88, which is preferably operated by a rotating shaft 91 carrying a sprocket wheel 92 connected by a sprocket chain 93 with a sprocket pinion 94 secured on the horizontal shaft 95 journaled in a bearing formed in the wall of the casing 20. On the inside of the casing is a bevel wheel 96 secured on the shaft 95 and meshing with the bevel pinion 97 secured on the vertical shaft 98, which has the spur gear wheel 99 thereon meshing with the spur gear pinion 100 secured on the shaft 15, so that the turbine, through the gearing described, also serves to drive the air pump 88. Where the milk is to be delivered at a point above the bottom of the cover casing 55, the shaft 95 is provided with a worm 101 rotating in the casing 102, which is connected at one end by the pipe 103 with the pipe 104 connected to the bottom of the cover casing 55, and from which the clarified and heated milk is delivered. The other end of the casing 102 has the pipe 105 leading to the holder or wherever the milk is to be delivered.

The discharge outlet of the air pump 88 is connected to a pipe 106, which is passed into the interior of the sleeve 87 and is given a few helical turns through the sleeve and emerges adjacent the tank 80, where a vertical portion 107 of the pipe leads up above the top of the overflow pipe 84 and enters the side of the tank 80, and a portion 108 thereof continues down to the bottom of the tank, where it is provided with a horizontal discharge portion 109 having suitable apertures therein. Secured in the center of the sleeve 81, and extending upward from near the bottom thereof, and passing out through its top, is the pipe 110, which through an extension 111 passes down toward the bottom of the tank 80, which it enters through the horizontal portion 112, which, inside of the tank, is continued in the helical portion 113, extending below the level of the overflow pipe 84. Above this pipe 84, the helical portion 113 is continued through the straight portion 114, which passes out through the top of the tank 80, and is led through the horizontal portion 115 into the top of the cover casing 55 and opposite the larger discharge pipe 116 leading from the top of the casing to the atmosphere. A discharge pipe 117 for the water of condensation in the drum is connected to the interior of the annular casing 61, 62 and 63, and passes out through a suitable recess 118 formed in the upper portion of the wall of the cover casing 55, so that the parts can be readily assembled and taken apart for cleaning. The turned-down end 119 of the pipe 117 discharges the water of condensation into the funnel 120 secured on the upper end of the pipe 121, preferably provided with a cock 122 and opening into the side of the tank 80 at 123.

The operation of the complete apparatus is as follows:

The milk to be clarified, purified, aerated and heated is delivered into the cup 73 through the pipe 78, the valve 75 coöperating with the aperture 74 in the bottom of the cup serving to regulate the flow of the milk and prevent its entering more rapidly than the apparatus can dispose of it. The milk flowing through the aperture 74 passes down through the channels 67 and into the upper chamber of the drum, the eccentric location of the channels 67 being necessary to discharge the milk into the annular chamber in the top of the drum, from which the milk passes down through the passages formed by the tubes 39 to the bottom of the lower chamber, the outer wall of which is formed by the truncated conical casing 25. As the entire drum is rotated rapidly, the milk is hurled by centrifugal action to the peripheries of both the annular chambers, and the pockets formed by the radial partitions 43 and 45 serve to collect the solid impurities which may be present in the milk. The milk in the outer and lower chamber of the drum passes up and through the passages 51, 50 and 49, and is discharged tangentially outward against the under side of the annular flange 62. The heated air subsequently referred to fills the annular chamber formed within the cover 55, and the hot milk thus sprayed through the washed and heated air is thoroughly aerated, and any disagreeable odors that it may have are carried off by the washed and heated air rising through the discharge outlet 116.

At the same time, with the cock 66 open, the steam from the pipe 11 passes through the pipe 65 into the interior of the drum 64 and down through the pipe 70, and out through the apertures 72 in the tube 34, and into the hollow drum 31. Here the steam is condensed as its heat is extracted by the milk flowing through the pipes 39, and it eventually fills the drum and passes up through the annular passage between the sleeve 41 and the tube 34, through the aperture 42, and out through the passages 40, this water of condensation thus collecting in the annular channel or receptacle formed by the annular sheet-metal piece 61, 62, 63. The pure water of condensation flows out through the pipe 117, and is carried by the pipe 121 into the bottom of the tank 80, where it is employed to heat and wash the air passing through the water in this tank. As previously noted, cold air from the outside is pumped in through the strainer 89, pipe 90, and by the pump 88 is forced through the pipe 107, where, in passing through the sleeve 87, the exhaust steam serves to heat the air and increase its temperature. This heated air, passing through the tubes 107 and 108, is discharged from the tube 109 into the water accumulated in the bottom of the tank 80 below the top of the overflow pipe 84, and rises through the heated water, being thoroughly washed and further heated in the process. Escaping from the water, it passes up to the top of the tank 80, and inward through the apertures 82 to the sleeve 81, and down to the bottom of said sleeve, whence it escapes up through the pipe 110, whence it is carried by the pipes 111 and 112 to the helical pipe 113 within the water of condensation, where it is more thoroughly heated, and tempered, and passes from the tank 80, through the pipe 114, to the cover casing 55 at any desired temperature, such, for instance, as the purifying and clarifying temperature. This air pumped through the pipe 115 into one side of the casing 55, flows freely in both directions around the interior of the casing to the discharge outlet 116, aerating and purifying the milk and carrying off any undesirable odors in its passage.

While we have shown and described our invention as embodied in the form which we at present consider best adapted to carry out its purposes, it will be understood that it is capable of modifications, and that we do not desire to be limited in the interpretation of the following claims except as may be necessitated by the state of the prior art.

What we claim as new, and desire to secure by Letters Patent of the United States, is:

1. In apparatus of the class described, the combination with a rotating member serving to propel a thin sheet or spray of liquid, of means for heating said liquid before it is thus propelled, an inclosed aerating chamber in which said liquid is propelled in a thin sheet or spray, and means for delivering heated air to said chamber.

2. In apparatus of the class described, the combination with a rotating bowl having passages from which thin sheets or sprays of liquid may be driven, of means for heating said liquid while it is traversing the passages, an inclosed annular aerating passage into which said liquid is discharged, and means for delivering heated air to said annular aerating passage.

3. In apparatus of the class described, the combination with a rotating bowl, of a steam chamber therein, milk passages leading through the steam chamber to the bowl, and means for supplying steam to said chamber.

4. In apparatus of the class described, the combination with a rotating bowl, of a steam chamber therein, milk passages leading through the steam chamber to the bowl, and means for supplying steam to said chamber, said means consisting of a stationary pipe extending down into the center of the bowl, and a central perforated pipe into which it discharges, the perforations opening into the steam chamber.

5. In apparatus of the class described, the combination with a casing, of a vertical spindle journaled therein, a centrifugal bowl carried by the spindle, an annular collection chamber into which the bowl discharges, a rotary pump, gearing connecting the spindle and pump shaft, and a delivery pipe connecting the collection chamber and the pump casing.

6. In apparatus of the class described, the combination with a casing, of a vertical spindle journaled therein, means for rotating said spindle, a centrifugal bowl carried by the spindle, an annular collection chamber into which the bowl discharges, a horizontal rotary pump-casing, an operating shaft therein, a bevel wheel on the inner end of said shaft, a bevel gear meshing with said bevel wheel, a spur gear secured to the bevel gear, and a spur gear pinion secured on the vertical spindle meshing with the spur gear wheel.

7. In apparatus of the class described, the combination with a casing, of a bowl mounted to rotate therein, a steam pipe discharging into the center of the bowl, an annular milk-receiving chamber, a disk-shaped steam chamber on the top of the steam pipe having eccentric milk passages therethrough, a double-bottom milk receptacle on the steam chamber having openings in its lower bottom registering with the eccentric milk passages, a central passage in the upper bottom, a discharge nozzle above the milk receptacle, and a float coöperating with the nozzle and with the central passage, substantially as and for the purpose described.

8. In apparatus of the class described, the combination with a bowl and means for rotating it, of a central steam passage, a steam chamber surrounding and connected to the steam passage, an annular milk receptacle at the top of the bowl, and pipes extending through the steam chamber and connecting the annular milk receptacle and the bowl proper.

9. In apparatus of the class described, the combination with a bowl and means for rotating it, of a central steam passage, a steam chamber surrounding and connected to the steam passage, an annular milk receptacle at the top of the bowl, pipes extending through the steam chamber and connecting the annular milk receptacle and the bowl proper, discharge passages from the top of the bowl for the milk, discharge passages from the top of the steam chamber for the water of condensation, and annular collecting basins coöperating with said passages.

10. In apparatus of the class described, the combination with a rotating spindle, of a centrifugal bowl thereon, and a plurality of radial ribs projecting inwardly from the walls of the bowl, for the purpose described.

11. In apparatus of the class described, the combination with a rotating spindle, of a centrifugal bowl therein having a plurality of radial ribs projecting inwardly from the walls thereof, a receiving bowl above the centrifugal bowl likewise provided with a plurality of radial ribs projecting inwardly from its walls, and passages connecting the two bowls.

12. In apparatus of the class described, the combination with a rotating spindle, of a centrifugal bowl therein having a plurality of radial ribs projecting inwardly from the walls thereof, a receiving bowl above the centrifugal bowl likewise provided with a plurality of radial ribs projecting inwardly from its walls, passages connecting the two bowls, a steam chamber surrounding said passages, and means for supplying steam to the chamber.

13. In apparatus of the class described, the combination with a rotating bowl provided with means for discharging milk therefrom centrifugally, of means for passing a heating fluid through said bowl to warm the milk passing therethrough without commingling therewith.

14. In apparatus of the class described, the combination with a rotating bowl, of a collecting annulus for milk discharged therefrom centrifugally, means for passing a heating fluid through said bowl to warm the milk passing therethrough without commingling therewith, and another collecting annulus for the centrifugally-discharged heating-fluid.

15. In apparatus of the class described, the combination with a main bowl having centrifugal discharge passages from the top thereof, of an auxiliary bowl above the main bowl and rotating therewith, a heating-fluid cylinder within the main bowl, pipes passing from the bottom of the auxiliary bowl through the heating-fluid cylinder and opening into the bottom of the main bowl, and means for supplying the heating-fluid cylinder with heating fluid.

16. In apparatus of the class described, the combination with a main bowl having centrifugal discharge passages from the top thereof, of an auxiliary bowl above the main bowl and rotating therewith, a heating-fluid cylinder within the main bowl, pipes passing from the bottom of the auxiliary bowl through the heating-fluid cylinder and opening into the bottom of the main bowl, and means for supplying the heating-fluid cylinder with heating fluid, said heating-fluid cylinder being provided with centrifugal discharge passages.

17. In apparatus of the class described, the combination with a main bowl having centrifugal discharge passages from the top thereof, of an auxiliary bowl above the main bowl and rotating therewith, a heating-fluid cylinder within the main bowl, pipes passing from the bottom of the auxiliary bowl through the heating-fluid cylinder and opening into the bottom of the main bowl, a pipe leading from the heating-fluid cylinder up through the auxiliary bowl, and a smaller stationary pipe extending down inside the rotating pipe into the heating-fluid cylinder.

18. In apparatus of the class described, the combination with a rotating bowl provided with means for discharging milk therefrom centrifugally, of a chamber into which the milk is sprayed by centrifugal action, and means for forcing a current of air through said chamber to aerate the milk.

19. In apparatus of the class described, the combination with a rotating bowl provided with means for discharging milk therefrom centrifugally, of an annular chamber into which the milk is sprayed by centrifugal action, an air pump, and pipes connecting the pump with the annular chamber so that a current of air can be forced through said chamber to aerate the milk.

20. In apparatus of the class described, the combination with a rotating bowl provided with means for discharging milk therefrom centrifugally, of a chamber into which the milk is sprayed by centrifugal action, a wash-water tank, and means for forcing a supply of air through the water in said tank and thence to the chamber to aerate the milk.

21. In apparatus of the class described, the combination with a rotating bowl provided with means for discharging milk therefrom centrifugally, of means for passing a heating fluid through said bowl to warm the milk without commingling therewith, a chamber into which the milk is sprayed by centrifugal action, and means for forcing a current of air through said chamber to aerate the heated milk.

22. In apparatus of the class described, the combination with a rotating bowl provided with means for discharging milk therefrom centrifugally, of means for passing a heating fluid through said bowl to warm the milk passing therethrough without commingling therewith, a chamber into which the milk is sprayed by centrifugal action, a wash-water tank, and means for forcing a supply of air through the water in the tank and through the chamber to aerate the heated milk.

23. In apparatus of the class described, the combination with a rotating bowl provided with means for discharging milk therefrom centrifugally, of means for passing a heating fluid through said bowl to warm the milk passing therethrough without commingling therewith, a chamber into which the milk is sprayed by centrifugal action, a wash-water tank, means for forcing a supply of air through the water in the tank and through the chamber to aerate the heated milk, a collecting chamber into which the heating fluid is discharged after passing through the bowl, and a pipe leading from the heating-fluid collecting-chamber to the wash-water tank.

24. In apparatus of the class described, the combination with a spindle, of a base disk secured thereon, an outer conical cylinder on the base disk, a cover disk for the conical cylinder, an inner cylinder secured to the bottom of the cover disk, and a base disk for the inner cylinder having an extension screwed into the base disk.

25. In apparatus of the class described, the combination with a spindle, of a base disk secured thereon, an outer conical cylinder on the base disk, a cover disk for the conical cylinder, an inner cylinder secured to the bottom of the cover disk, a base disk for the inner cylinder having an extension screwed into the base disk, and a conical supplemental bowl secured on top of the cover disk.

26. In apparatus of the class described, the combination with a spindle, of a base disk secured thereon, an outer conical cylinder on the base disk, a cover disk for the conical cylinder, an inner cylinder secured to the bottom of the cover disk, a base disk for the inner cylinder having an extension screwed into the base disk, a conical supplemental bowl secured on top of the cover disk, and a plurality of tubes extending through the cover disk and the base disk for the inner cylinder so as to furnish passages from the supplemental bowl to the bottom of the main bowl 27. In apparatus of the class described, the combination with a spindle, of a base disk secured thereon, an outer conical cylinder on the base disk, a cover disk for the conical cylinder, an inner cylinder secured to the bottom of the cover disk, a base disk for the inner cylinder having an extension screwed into the base disk, a conical supplemental bowl secured on top of the cover disk, a plurality of tubes extending through the cover disk and the base disk for the inner cylinder so as to furnish passages from the supplemental bowl to the bottom of the main bowl, and a heating-fluid supply pipe extending down through the auxiliary bowl and the cover disk and into the inner cylinder.

28. In apparatus of the class described, the combination with a rotating bowl, of an annular casing into which the milk is discharged centrifugally, a shaft for the bowl, an air pump, gearing for driving the pump from the shaft, and pipes connecting the air pump with the annular casing to deliver air thereto to aerate the milk.

29. In apparatus of the class described, the combination with a rotating bowl, of an annular casing into which the milk is discharged centrifugally, a shaft for the bowl, an air pump, pipes connecting the air pump with the annular casing to deliver air to said casing to aerate the milk, a pipe leading from the annular casing, a milk pump connected with the pipe, and gearing connected with the shaft for driving both pumps.

30. In apparatus of the class described, the combination with a rotating bowl, of an annular casing into which the milk is discharged centrifugally, a shaft for the bowl, an air pump, pipes connecting the air pump with the annular casing to deliver air to said casing to aerate the milk, a pipe leading from the annular casing, a milk pump connected with the pipe, and gearing connected with the shaft for driving both pumps, said gearing consisting of a spur gear wheel on the shaft, a spur gear wheel meshing therewith, a bevel pinion secured to the spur gear wheel, a bevel wheel secured on the shaft of the milk pump, a sprocket wheel secured on the same shaft, a sprocket wheel on the shaft of the pump, and a sprocket chain connecting the sprocket wheels.

31. In apparatus of the class described, the combination with a rotating bowl, of an annular collecting chamber, a spindle on which the bowl is mounted, a steam turbine secured to the spindle, an exhaust pipe for the turbine, an air pump, gearing from the spindle to the air pump, a convoluted air pipe extending from the pump through the exhaust pipe, and pipes leading from the convoluted air pipe to the annular collecting chamber.

32. In apparatus of the class described, the combination with a rotating bowl, of an annular collecting chamber, a spindle on which the bowl is mounted, a steam turbine secured to the spindle, an exhaust pipe for the turbine, an air pump, gearing from the spindle to the air pump, a convoluted air pipe extending from the pump through the exhaust pipe, a water tank, a pipe leading from the convoluted air pipe to the bottom of the water tank, and a pipe from the top of the water tank to the annular collecting chamber.

33. In apparatus of the class described, the combination with a rotating bowl, of an annular collecting chamber, a spindle on which the bowl is mounted, a steam turbine secured to the spindle, an exhaust pipe for the turbine, an air pump, gearing from the spindle to the air pump, a convoluted air pipe extending from the pump through the exhaust pipe, pipes leading from the convoluted air pipe to the annular collecting chamber, a water tank, a pipe connecting the convoluted air pipe with the bottom of the water tank, a convoluted pipe in the water tank connected with the top thereof, and a pipe connecting the convoluted pipe to the annular collecting chamber.

34. In apparatus of the class described, the combination with a rotating bowl, of an annular collecting chamber, a spindle on which the bowl is mounted, a steam turbine secured to the spindle, an exhaust pipe for the turbine, an air pump, gearing from the spindle to the air pump, a convoluted air pipe extending from the pump through the exhaust pipe, a water tank, a pipe leading from the convoluted air pipe to the bottom of the water tank, a pipe from the top of the water tank to the annular collecting chamber, means within the bowl for applying heating fluid thereto, an annular chamber associated with the bowl to receive the waste heating fluid, and pipes leading from the annular waste-fluid chamber to the tank.

35. In apparatus of the class described, the combination with a centrifugal bowl, of a collecting annulus therefor, means for rotating the bowl, an air pump, a tank into the bottom of which the air pump discharges, a coil in the bottom of the tank, a pipe connecting said coil with the top of the tank, and a pipe from the coil to the collecting annulus.

36. In apparatus of the class described, the combination with a centrifugal bowl, of a collecting annulus therefor, means for rotating the bowl, an air pump, a tank into the bottom of which the air pump discharges, a coil in the bottom of the tank, a pipe connecting said coil with the top of the tank, a pipe from the coil to the collecting annulus, means for supplying heating fluid to the centrifugal bowl, a collecting annulus for the exhaust heating fluid, and a pipe connecting the heating-fluid collecting-annulus with the tank.

37. In apparatus of the class described, the combination with a rotating bowl provided with means for discharging milk therefrom, of a wash-water tank, means for supplying the same with distilled water, and means for forcing a supply of air through the water in said tank and thence over the milk acted upon by the bowl.

In witness whereof, we have hereunto set our hands and affixed our seals this 23rd day of November, A. D. 1916.

WILLIAM J. DAVIS. [L. S.]
LARS JOHNSON. [L. S.]

Witness:
JOHN HOWARD McELROY.